(12) United States Patent
Abdelnour

(10) Patent No.: US 6,510,017 B1
(45) Date of Patent: Jan. 21, 2003

(54) CALIBRATION OF READER/WRITER OFFSET IN A DISC DRIVE

(75) Inventor: Ghassan M. Abdelnour, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/473,622

(22) Filed: Dec. 29, 1999

Related U.S. Application Data

(60) Provisional application No. 60/121,026, filed on Feb. 22, 1999.

(51) Int. Cl.⁷ .............................................. G11B 5/596
(52) U.S. Cl. ................................................... 360/77.04
(58) Field of Search .......................... 360/25, 31, 75, 360/77.04, 77.08, 53, 68, 46

(56) References Cited

U.S. PATENT DOCUMENTS

| | | | |
|---|---|---|---|
| 5,404,253 A | 4/1995 | Painter ..................... | 360/77.04 |
| 5,444,583 A | 8/1995 | Ehrlich et al. ........... | 360/78.09 |
| 5,535,072 A | 7/1996 | Witt et al. ................ | 360/99.06 |
| 5,539,714 A | 7/1996 | Andrews, Jr. et al. ... | 369/44.26 |
| 5,550,685 A | 8/1996 | Drouin ..................... | 360/77.08 |
| 5,608,586 A | 3/1997 | Sri-Jayantha et al. .... | 360/77.04 |
| 5,886,846 A | 3/1999 | Pham et al. ............. | 360/78.04 |
| 5,978,169 A | 11/1999 | Woods ..................... | 360/77.04 |
| 6,377,417 B1 * | 4/2002 | Ahn ......................... | 360/77.04 |

* cited by examiner

Primary Examiner—Regina N. Holder
Assistant Examiner—Mitchell Slavitt
(74) Attorney, Agent, or Firm—Westman, Champlin & Kelly, P.A.

(57) ABSTRACT

A method for improving read error rates in a disc drive employing repeatable run-out compensation for writing but not for reading is disclosed. Pursuant to the method, a repeatable run-out compensation system which compensates for repeatable run-out during write operations but not during read operations is implemented. After implementing the repeatable run-out compensation system, reader-to-writer offset calibration is performed. In one embodiment of the present invention, after implementing the repeatable run-out compensation system, read error rates are experimentally determined for a given data track across a range of reader-to-writer offset values. Then a curve representing read error rates as a function of reader-to-writer offset is generated. The optimum reader-to-writer offset is then determined based on the shape of the curve. A disc drive employing this method is also disclosed.

10 Claims, 6 Drawing Sheets

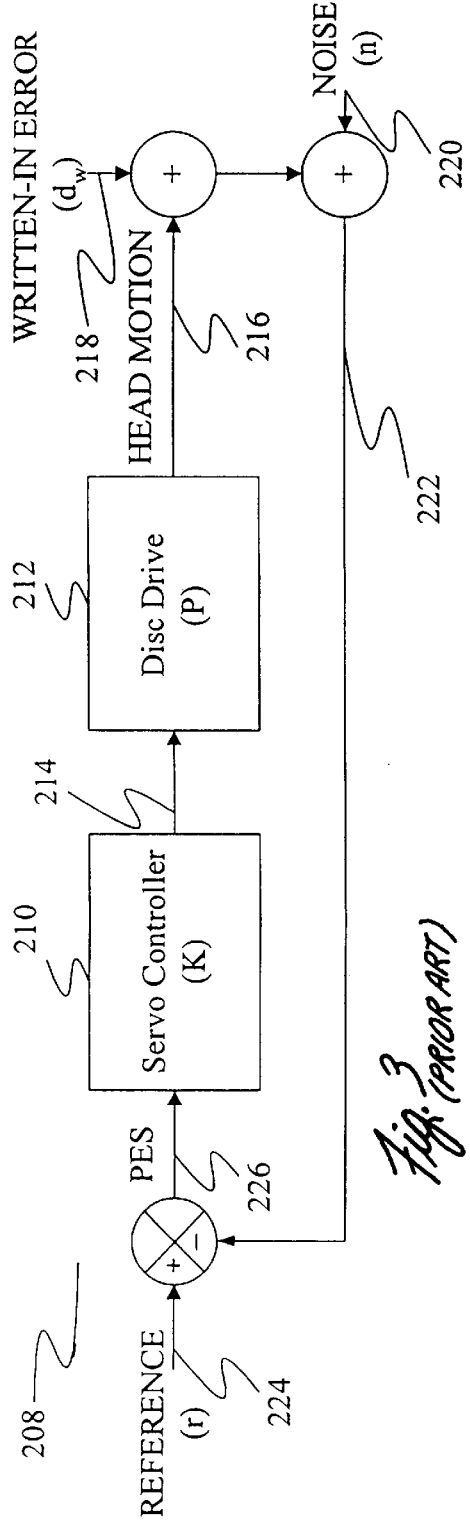
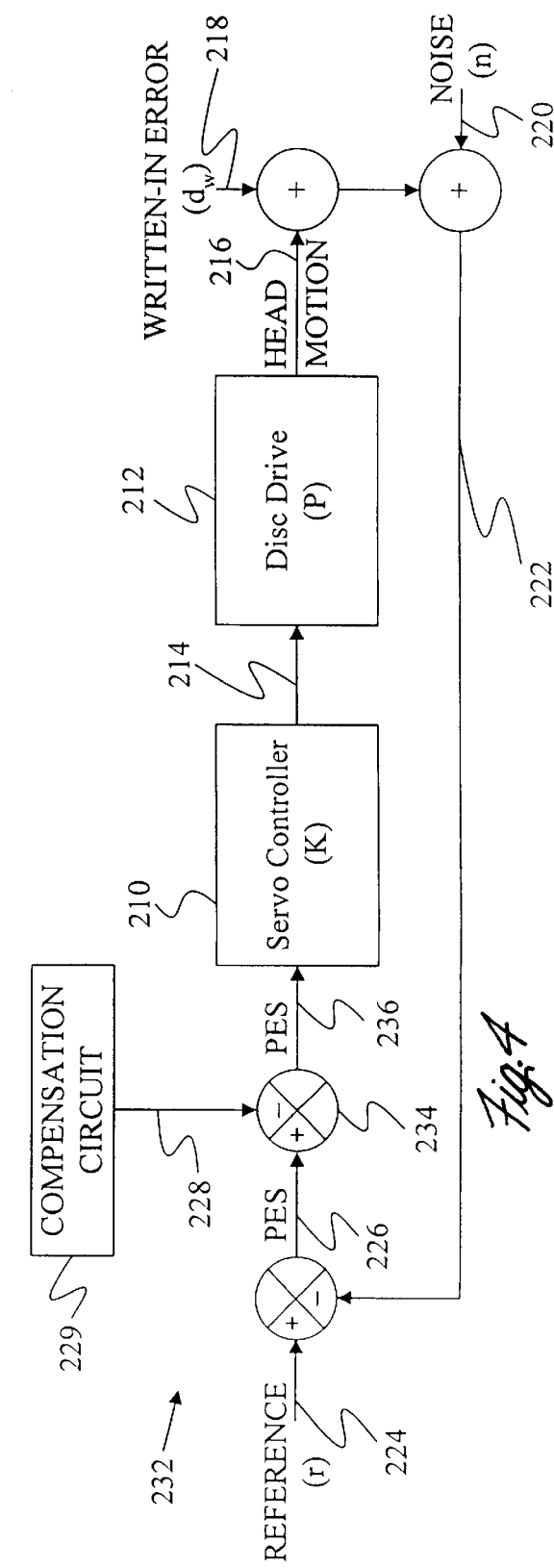
Fig. 3 (PRIOR ART)
Fig. 4

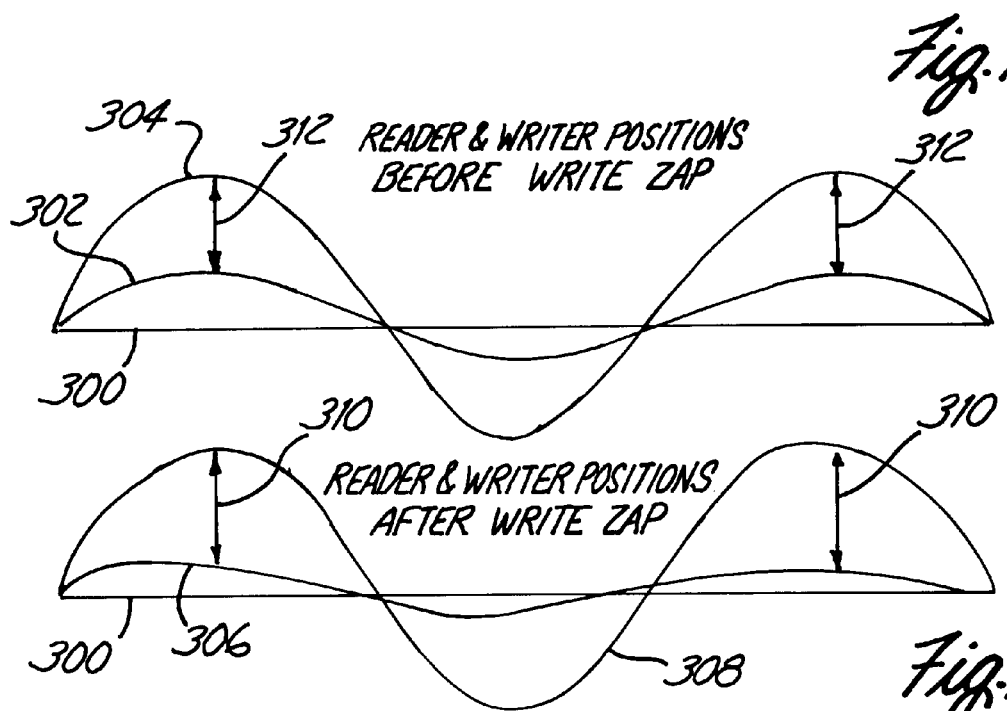
Fig. 5-1
Fig. 5-2
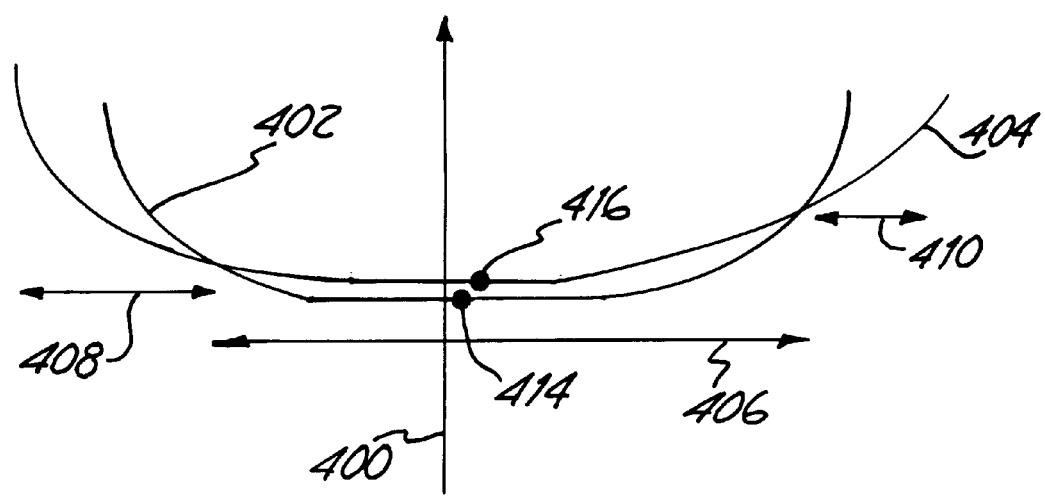
Fig. 6

CALIBRATION OF READER/WRITER OFFSET IN A DISC DRIVE

CROSS-REFERENCE TO RELATED APPLICATIONS

This application claims the benefit of U.S. Provisional Patent Application No. 60/121,026 entitled "READ ERROR RATES WHEN USING WRITE ZAP AND NO READ ZAP," filed on Feb. 22, 1999.

The following U.S. patent applications, assigned to the same assignee as the present invention, are related to the present application:

U.S. patent application Ser. No. 09/106,443 entitled "COMPENSATION FOR REPEATABLE RUN-OUT ERROR," filed on Jun. 29, 1998 now U.S. Pat. No. 6,069,764.

U.S. patent application Ser. No. 09/370,823 entitled "COMPENSATION FOR REPEATABLE RUNOUT ERROR," filed on Aug. 9, 1999.

U.S. patent application Ser. No. 09/394,160 entitled "MULTI-RATE SERVO DISC DRIVE WITH MULTI-RATE WRITTEN-IN REPEATABLE RUN-OUT COMPENSATION," filed on Sep. 13, 1999.

U.S. patent application Ser. No. 09/394,756 entitled "CONCENTRIC SPACING OF VIRTUAL DATA TRACKS USING RUN-OUT COMPENSATION," filed on Sep. 13, 1999, now U.S. Pat. No. 6,392,834.

FIELD OF THE INVENTION

The present invention relates generally to disc drive data storage systems. More particularly, the present invention relates to disc drives employing repeatable run-out compensation for write operations.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position. A multi-rate servo system samples the position of the head relative to a particular track at a particular sampling rate and adjusts the position of the head at a rate that is a multiple of the sampling rate by estimating the position of the head between the measured position samples.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable run-out errors because they cause the same errors each time the head passes along a track. As track densities increase, these repeatable run-out errors begin to limit the track pitch. Specifically, variations between the ideal track path and the actual track path created by the servo fields can result in an inner track path that interferes with an outer track path. This is especially acute when a first written-in error causes a head to be outside of an inner track's ideal circular path and a second written-in error causes the head to be inside of an outer track's ideal circular path. To avoid limitations on the track pitch, a system is needed to compensate for repeatable run-out errors.

The written-in errors can be compensated by injecting stored compensation values into the servo loop both during read operations and during write operations. However, such a process imposes considerable constraints on the manufacture of the disc drive, such as cost, factory test time and memory size.

The present invention provides a solution to this and other problems and offers other advantages over the prior art.

SUMMARY OF THE INVENTION

The present invention relates to disc drives employing repeatable run-out compensation for write operations.

One embodiment of the present invention is directed to a method for improving read error rates in a disc drive employing repeatable run-out compensation for writing but not for reading. Pursuant to the method, a repeatable run-out compensation system which compensates for repeatable run-out during write operations but not during read operations is implemented. After implementing the repeatable run-out compensation system, reader-to-writer offset calibration is performed.

In one embodiment of the present invention, after implementing the repeatable run-out compensation system, read error rates are experimentally determined for a given data track across a range of reader-to-writer offset values. Then a curve representing read error rates as a function of reader-to-writer offset is generated. The optimum reader-to-writer offset is then determined based on the shape of the curve.

Another embodiment of the present invention is directed to a disc drive having a disc, a head, an actuator, a repeatable run-out circuit and a servo controller. The disc is capable of storing data and includes a servo track designed to store servo information that is used to indicate the position of a head relative to the servo track. The head has a writer capable of writing data to the disc and a reader capable of reading data from the disc. The actuator is capable of positioning the head relative to a surface of the disc in response to a servo control signal. The repeatable run-out compensation circuit is capable of compensating for repeatable run-out of the servo track during write operations. The repeatable run-out compensation circuit does not compensate for repeatable run-out of the servo track during read operations. The servo controller is capable of generating a servo control signal based in part on a reader-to-writer offset that is calibrated while the compensation circuit is operational.

These and various other features as well as advantages which characterize the present invention will be apparent upon reading of the following detailed description and review of the associated drawings.

BRIEF DESCRIPTION OF THE DRAWINGS

FIG. 3 is a block diagram of a servo loop of the prior art.

FIG. 4 is a block diagram of a servo loop according to an illustrative embodiment of the present invention.

FIG. 5-1 is an illustrative repeatable run-out (RRO) profile before implementation of write RRO compensation without read RRO compensation.

FIG. 5-2 is an illustrative repeatable run-out profile after implementation of write RRO compensation without read RRO compensation.

FIG. 6 is a curve representing read error rates as a function of off-track distance before and after implementation of write RRO compensation without read RRO compensation according to an illustrative embodiment of the present invention.

FIG. 7-1 is a reader-to-writer offset profile for a servo system of the prior art.

FIG. 7-2 is a reader-to-writer offset profile for a servo system according to an illustrative embodiment of the present invention.

DETAILED DESCRIPTION OF ILLUSTRATIVE EMBODIMENTS

Figure 1:
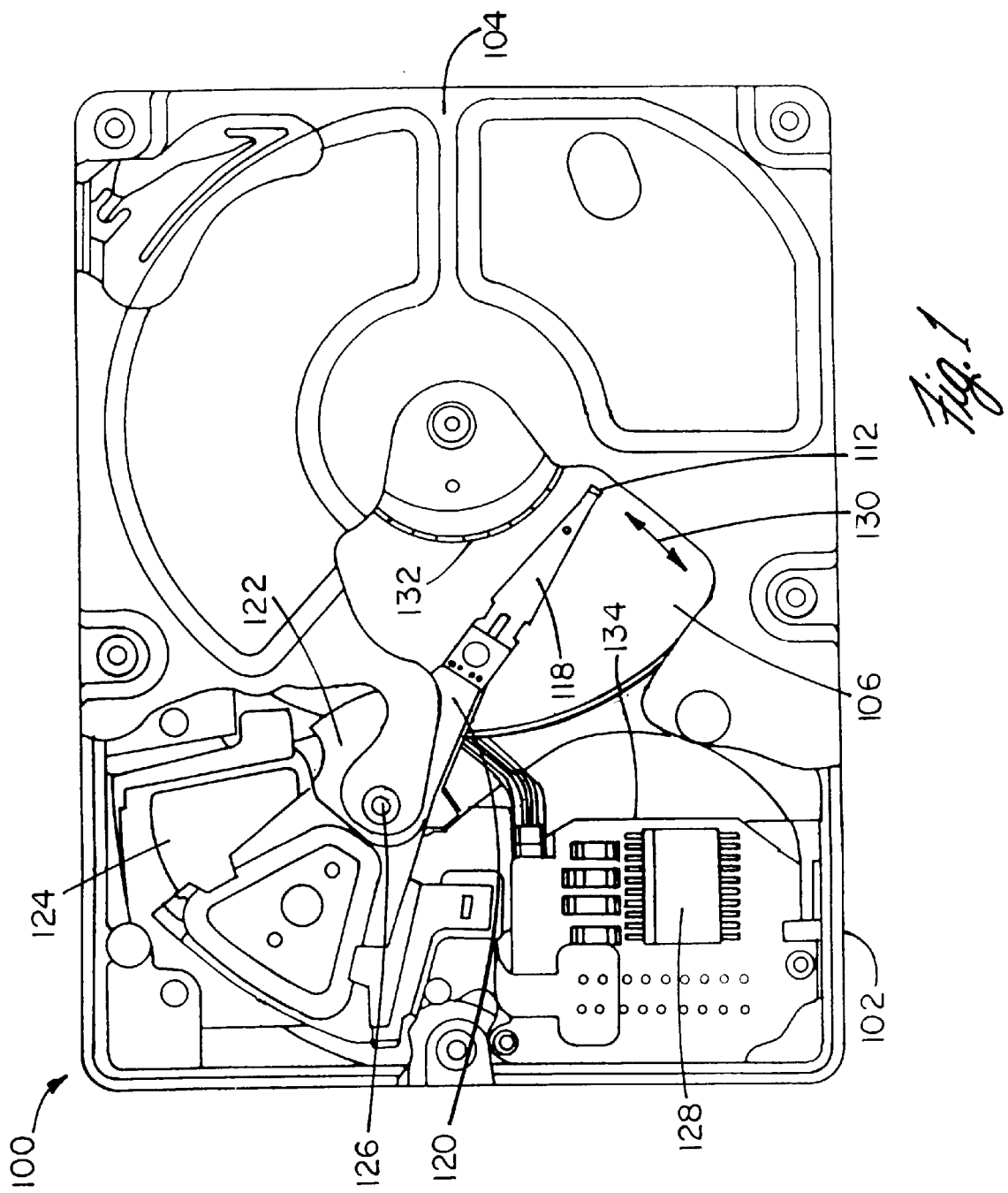
FIG. 1 is a plan view of a disc drive according to an illustrative embodiment of the present invention.

FIG. 1 is a plan view of a disc drive 100 that includes a housing with base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an arcuate path 130 between a disc inner diameter 132 and a disc outer diameter 134. When the head is properly positioned, write circuitry within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

Figure 2:
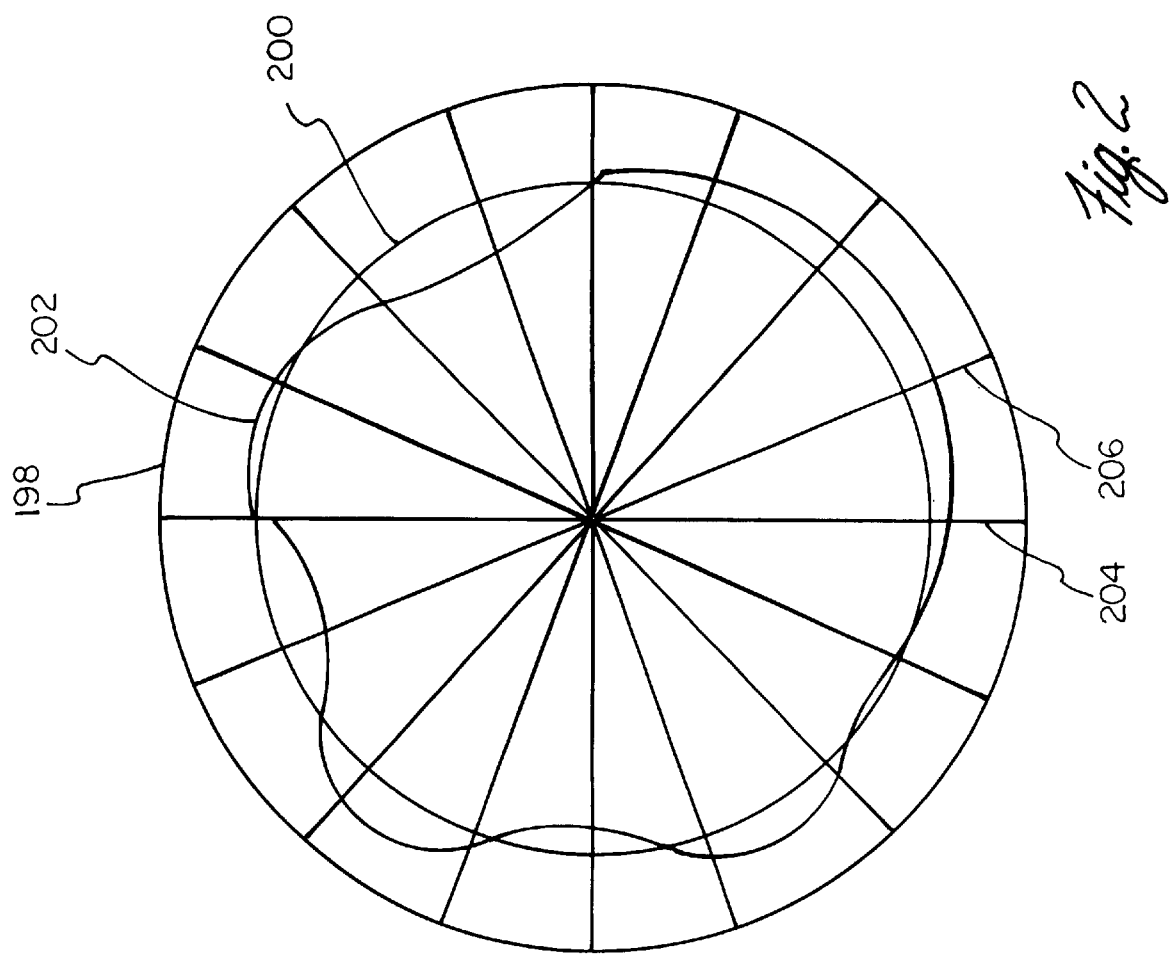
FIG. 2 is a top view of a surface of a disc according to an illustrative embodiment of the present invention.

FIG. 2 is a top view of a surface 198 of a disc showing an ideal, perfectly circular track 200 and an actual track 202. Section 198 includes a plurality of radially extending servo fields such as servo fields 204 and 206. The servo fields include servo information that identifies the location of actual track 202 along disc section 198.

Any variation in the position of a head away from circular track 200 is considered a position error. The portions of track 202 that do not follow circular track 200 create written-in repeatable run-out (RRO) position errors. A position error is considered a repeatable run-out error if the same error occurs each time the head passes a particular circumferential location on the disc. Track 202 creates a repeatable run-out error because each time a head follows the servo fields that define track 202, it produces the same position error relative to ideal track 200.

Under the present invention, a head attempting to write to track 202 will not follow track 202 but instead will more closely follow perfectly circular track 200. This is accomplished using a compensation signal that prevents the servo system from tracking repeatable run-out errors resulting from the irregular shape of track 202.

FIG. 3 is a block diagram of a servo loop 208 of the prior art. The servo loop includes a servo controller 210, having a gain of "K" and a disc drive 212 having a gain of "P". Servo controller 210 is the servo control circuitry within internal circuit 128 of FIG. 1. Disc drive 212 includes actuator assembly 122, voice coil motor 124, track accessing arm 120, suspension 118, and head gimbal assembly 112, all of FIG. 1.

Servo controller 210 generates a control current 214 that drives the voice coil motor of disc drive 212. In response, disc drive 212 produces head motion 216. In FIG. 3, the written-in error, $d_w$, is represented as a separate input signal 218 even though the written-in error would otherwise appear implicitly in head motion 216. The separation of written-in error 218 from head motion 216 provides a better understanding of the present invention. In addition, noise in the servo system has been separated and appears as noise 220, which is added to the head motion. The sum of head motion 216, written-in error 218 and noise 220 results in the head's servo position signal 222. Servo position signal 222 is subtracted from a reference signal 224, which is generated by internal circuitry 128 based on a desired location for the head. Subtracting servo position signal 222 from reference signal 224 produces position error signal 226 which is input to servo controller 210.

Heads in servo loops without repeatable run-out compensation move in response to written-in errors. This movement is undesirable since it places the head outside of the ideally circular track path. To eliminate the unwanted head motion created by the written-in error, the present invention subtracts a compensation signal from the servo loop of the prior art during write operations. This subtraction is shown in the servo loop 232 of FIG. 4. In FIG. 4, the elements that are common to FIG. 3 are numbered the same. Compensation signal 228 is produced by compensation circuitry 229. Compensation signal 228 comprises a sequence of written-in repeatable run-out values. In an illustrative embodiment, the compensation values are stored within the servo fields of the corresponding track. In a further illustrative embodiment, each compensation value is stored in the servo field of the servo sector for which the compensation value is intended to compensate for the written-in run-out. In an alternative embodiment, a compensation value corresponding to a given servo sector (or servo field) is stored in the servo field of the preceding servo sector and buffered by the servo system to insure that the servo system can write-protect over the user data in case an off-track condition is detected.

Compensation circuit 229 retrieves and demodulates the compensation values stored in the servo fields and produces compensation signal 228. Subtractor 234 subtracts the compensation value 228 associated with each servo sector from a corresponding servo value. In FIG. 4, the compensation signal 228 is subtracted from the position error signal 226, resulting in a compensated position error signal 236 comprising a sequence of compensated position error values. However, those skilled in the art will recognize that the compensation signal 228 can be subtracted at other locations within the servo loop 232. If the compensation values 228 are equal to the written-in error at the servo fields, the compensated position error signal 236 will contain only non-repeatable components. This result is provided to servo controller 210, which then drives the actuator based on the compensated position error signal 236 instead of the uncompensated position error signal 226. This forces the head to follow, except for non-repeatable disturbances, substantially circular and equally spaced tracks and causes the head to remain substantially still in inertial space with little acceleration from the servo system. Thus the effects of written-in error, $d_w$ 218, are substantially eliminated while writing data to the disc.

According to the present invention, repeatable run-out compensation will be performed during write operations but not during read operations. Employing repeatable run-out compensation during write operations significantly reduces the cost, factory test time and memory requirements involved with implementing repeatable run-out compensation. The use of write RRO compensation but no read RRO compensation does improve the write process but can, in certain situations, have an adverse affect on read error rates.

By applying write RRO compensation only, the on-track error rate could either degrade or improve depending on the RRO profile. FIGS. 5-1 and 5-2 show an illustrative RRO profile before and after implementation of write RRO compensation without read RRO compensation. Axis 300 represents a perfectly circular path, which is the goal of RRO compensation. In FIG. 5-1, plot 302 represents the path of the writer relative to the perfectly circular path 300 before write RRO compensation is implemented. Plot 304 represents the path of the reader relative to the perfectly circular path 300 before write RRO compensation is implemented. It can be seen that both the reader and writer stray from the ideal, perfectly circular path 300. Although in FIG. 5-1, the reader path 304 is shown to stray further from the perfectly circular path 300 than the writer path 302, this is an arbitrary condition. In other illustrative conditions, the writer path 302 may stray further from the perfectly circular path 300, or the writer path 302 and reader path 304 may stray equally from ideal path 300. However, in any case, without the benefit of RRO compensation, both the reader and writer are likely to stray from perfectly circular path 300.

In FIG. 5-2, plot 306 represents the path of the writer relative to the perfectly circular path 300 after write RRO compensation is implemented. Plot 308 represents the path of the reader relative to the perfectly circular path 300 after write RRO compensation is implemented. It can be seen that reader path 308 strays from perfectly circular path 300 to approximately the same degree as reader path 304 in FIG. 5-1. This is because, according to the present invention, no RRO compensation is performed during read operations. However, it can be seen that, as a result of the write RRO compensation, the writer follows a path 306 which more closely follows perfectly circular path 300. As a result, the distance 310 between the paths of the reader and writer after RRO compensation is greater than the distance 312 between the paths of the reader and writer before RRO compensation. This results in degradation of the read error rate.

In contrast, utilization of write RRO compensation will usually improve the off-track read error rate due to the reduction in track squeeze. This is because when data is written using RRO compensation, the result is data tracks which are closer to perfect circles, which results in a more regular distance between adjacent written data tracks. This, in turn, decreases the likelihood of inadvertently reading data on a track adjacent to the intended track.

In a preferred embodiment of the present invention, write RRO compensation is performed on every track of the disc surface. The RRO profile, and thus the RRO compensation, will vary from track to track. Therefore, the percent squeeze improvement may not be uniform from track to track. Because of this, the off-track error rate before and after write RRO compensation will be different. This can be seen in the "quality monitor bathtub curves" of FIG. 6. In FIG. 6, the x-axis (not shown) represents the distance of the reader from the center of the written data track. Y-axis 400 represents the read error rate. Curve 402 represents an illustrative read error rate before write RRO compensation and curve 404 represents an illustrative read error rate after write RRO compensation. In portion 406 of curves 402 and 404, where the reader is relatively close to the center of the data track, the read error rate is lower without write RRO compensation (curve 404). As explained above, this is because before write RRO compensation both the writer and reader follow the written servo track, whereas after write RRO compensation, the reader follows the written servo track while the writer deviates from the servo track due to the RRO compensation.

It can be seen in FIG. 6 that the floor error rate for each curve 402 and 404 remains approximately constant up to a certain distance from the center of the track, at which point the error rate starts to increase. As the distance from the center of the track increases, the error rate increases in an approximately parabolic fashion as a function of the off-track distance. Without write RRO compensation, the error rate increases more rapidly as the reader strays from the center of the track than it does with write RRO compensation. This is shown in portions 408 and 410 of FIG. 6. As explained above, this is because of the reduction in track squeeze achieved through write RRO compensation.

Reader-to-writer offset is the offset which must be applied by the servo system in order to read the previously written data. This offset changes as a function of the skew angle of the actuator arm relative to the data track. Therefore, the reader-to-writer offset varies from track to track. For instance, for a skew angle of zero, the reader-to-writer offset is zero. This reader-to-writer offset is typically calibrated in the factory test process prior to drive shipment. To find a read-to-writer offset value for a particular track, typically interference patterns are written in the guard bands on either side of the test track. A test pattern is written on track and squeeze patterns are written on adjacent tracks. Then read operations are performed to determine error rates across a range of both positive and negative offset values. This data is used to determine the optimum reader-to-writer offset. In one prior art method, a bathtub curve is generated from the error rate data. Then a "center of gravity" (COG) algorithm is used to select the optimum reader-to-writer offset value for the track under test based on the shape of the bathtub curve. Such a center of gravity algorithm is described in detail in U.S. Pat. No. 5,774,285, issued on Jun. 30, 1998, and assigned to the same entity as the present application.

As explained above, applying RRO compensation during write operations but not during read operations changes the shape of the bathtub curve relative to not using any RRO compensation at all. This results in a change in the optimum reader-to-writer offset. In FIG. 6, it can be seen that the optimum value for the reader-writer offset after implementing write RRO compensation 412 is different than the optimum value for the reader-writer offset before implementing write RRO compensation 414. Furthermore, the direction of the shift in optimum reader-to-writer offset may be different from track to track. Therefore, according to the present invention, the reader-to-writer offset is calibrated after implementing the write RRO compensation. This improves read performance by enabling the read head to more closely follow the written data track. In one illustrative embodiment, this post-RRO compensation calibration is performed on all of the tracks of the disc surface. This results in a highly accurate reader-to-writer offset calibration. In an alternative embodiment, the post-RRO compensation calibration is performed at fewer than all of the tracks (for example, 100 tracks) and the reader-to-writer offset at the intermediate tracks is obtained through interpolation. Interpolating the intermediate values is faster and less costly than performing the calibration at all tracks. Any interpolation method can be used, including linear interpolation and second order polynomial interpolation.

In an illustrative embodiment of the present invention, reader-to-writer offset calibration is performed prior to implementing the write RRO compensation without read RRO compensation. Then, after the write RRO compensation system is implemented, additional reader-to-writer offset, arising from the implementation of the write RRO compensation system, is determined.

Figure 7:
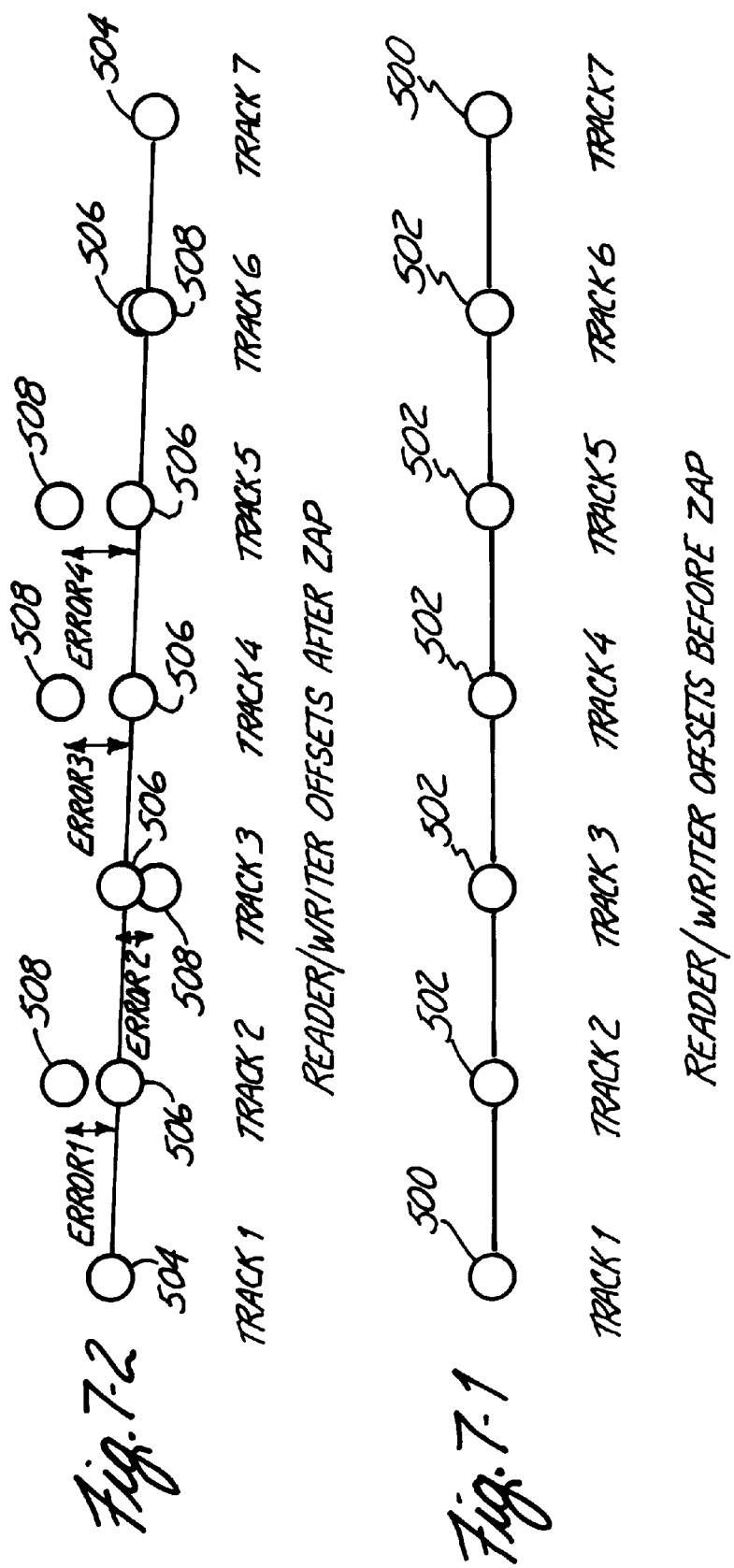

FIG. 7-1 shows reader-to-writer offset values for adjacent tracks of a hypothetical disc prior to implementing write RRO compensation. In this example, reader-to-writer offset 500 was calibrated at tracks 1 and 7 and the reader-to-writer offset 502 at tracks 2-6 was interpolated. FIG. 7-1 shows both the optimum and the actual reader-to-writer offsets at each track. Because FIG. 7-1 assumes perfect calibration and perfect interpolation, the optimum and actual reader-to-writer offsets are one and the same. It can be seen that the reader-to-writer offset from track to track varies linearly for small skew angles.

FIG. 7-2 shows optimum and actual reader-to-writer offset values for adjacent tracks of a hypothetical disc on which reader-to-writer offset calibration was performed after implementing write RRO compensation. Like the example of FIG. 7-1, reader-to-writer offset was performed on tracks 1 and 7 and a linear interpolation was performed to obtain the reader-to-writer offsets for tracks 2-6. Because reader-to-writer calibration was performed for tracks 1 and 7 after implementation of write RRO compensation, the actual and optimum reader-to-writer offsets 504 at tracks 1 and 7 are equal. This likely would not be the case if the reader-to-writer offsets were calculated before implementing the write RRO compensation. It can be seen in FIG. 7-2 that the interpolated actual reader-to-writer offset values 506 for tracks 2-6 are generally not equal to the optimum offset values 508. This is because the write RRO compensation changes the shape of the bathtub curves and this change is not uniform from track to track. Therefore, the linear interpolation does not produce a perfect result. Nevertheless, the linear interpolation does reduce the mean-squared-error (MSE) of the offset values 506. If in FIG. 7-2 the reader-to-writer offset calibration were performed on each track, the actual reader-to-writer offset would be equal to the optimum reader-to-writer offset at each track.

Figure 8:
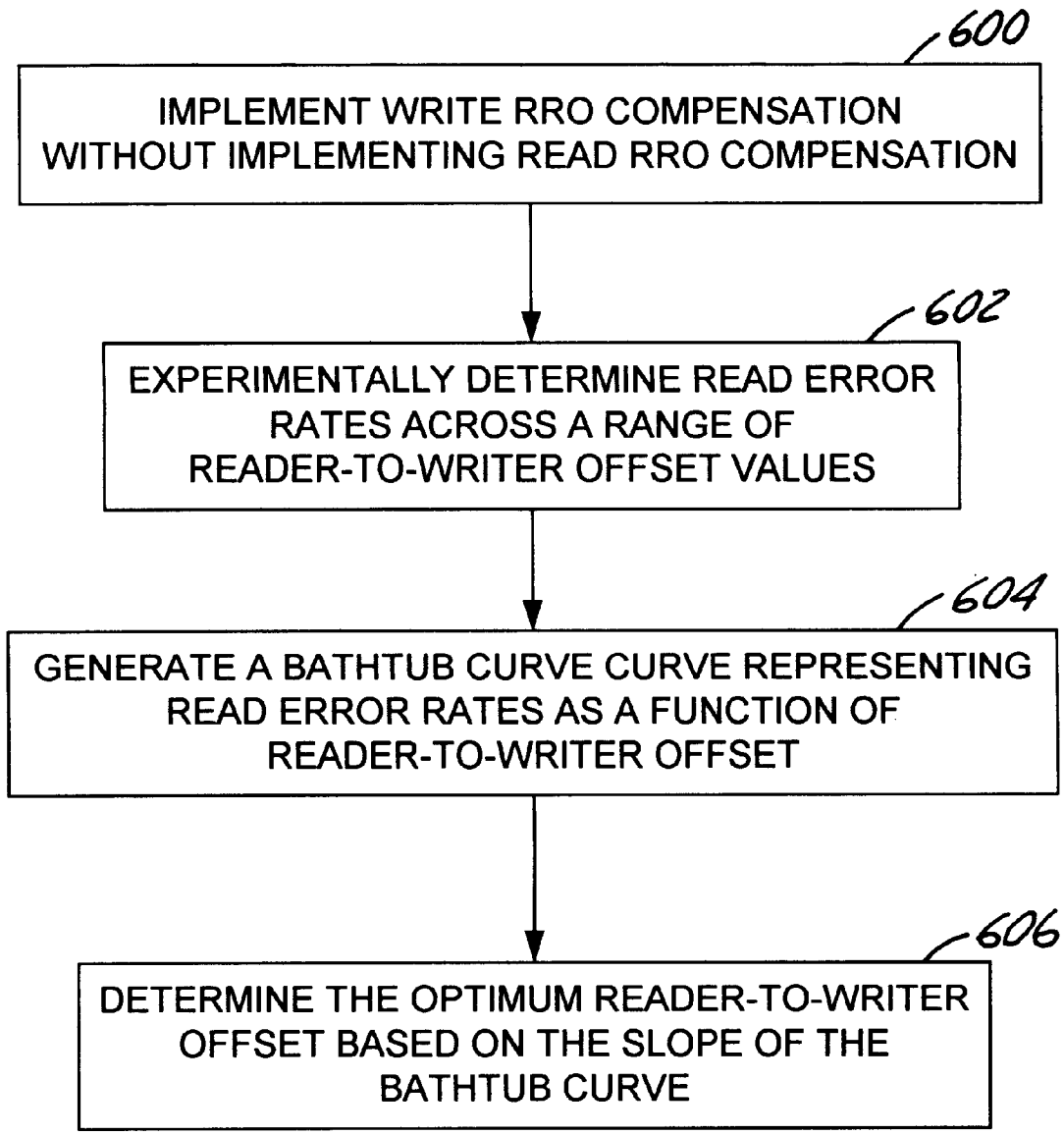
FIG. 8 is a flow chart representing a method for improving read error rates in a disc drive employing repeatable run-out compensation for writing but not for reading according to an illustrative embodiment of the present invention.

FIG. 8 is a flow chart representing a method for improving read error rates in a disc drive employing repeatable run-out compensation for writing but not for reading according to an illustrative embodiment of the present invention. At step 600, a repeatable run-out compensation system which compensates for repeatable run-out during write operations but not during read operations is implemented. At step 602, after implementing the repeatable run-out compensation system, read error rates are experimentally determined for a given data track across a arrange of reader-to-writer offset values. Then, at step 604, a bathtub curve representing read error rates as a function of reader-to-writer offset is generated. At step 606, the optimum reader-to-writer offset is then determined based on the shape of the curve. In an illustrative embodiment of the present invention, a center of gravity algorithm is used to select the optimum reader-to-writer offset value for a given track.

Thus, according to an illustrative embodiment of the present invention, repeatable run-out compensation circuit 229 of FIG. 4 compensates for repeatable run-out of the servo track during write operations but not during read operations. Servo controller 210 generates a servo control signal 214 based in part on a reader-to-writer offset that is calibrated while compensation circuit 229 is operational.

In summary, one embodiment of the present invention is directed to a method for improving read error rates in a disc drive 100 employing repeatable run-out compensation for writing but not for reading. Pursuant to the method, a repeatable run-out compensation system 229 which compensates for repeatable run-out during write operations but not during read operations is implemented. After implementing the repeatable run-out compensation system 229, reader-to-writer offset calibration is performed.

In one embodiment of the present invention, after implementing the repeatable run-out compensation system 229, read error rates are experimentally determined for a given data track 200 across a range of reader-to-writer offset values. Then a curve 404 representing read error rates as a function of reader-to-writer offset is generated. The optimum reader-to-writer offset is then determined based on the shape of the curve 404.

Another embodiment of the present invention is directed to a disc drive 100 having a disc 106, a head 112, an actuator 120, a repeatable run-out circuit 229 and a servo controller 210. The disc 106 is capable of storing data and includes a servo track 202 designed to store servo information that is used to indicate the position of the head 112 relative to the servo track 202. The head 112 has a writer capable of writing data to the disc 106 106and a reader capable of reading data from the disc. The actuator 120 is capable of positioning the head 112 relative to a surface of the disc 106 in response to a servo control signal 214. The repeatable run-out compensation circuit 229 is capable of compensating for repeatable run-out of the servo track 202 during write operations. The repeatable run-out compensation circuit 229 does not compensate for repeatable run-out of the servo track 202 during read operations. The servo controller 210 is capable of generating a servo control signal 214 based in part on a reader-to-writer offset that is calibrated while the compensation circuit 229 is operational.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the reader-to-writer offset calibration of the present invention may be employed in disc drives that use non-magnetic data storage means, for example, optical storage devices, without departing from the scope and spirit of the present invention. Other modifications can also be made.

What is claimed is:

1. A method for improving read error rates in a disc drive employing repeatable run-out compensation for writing but not for reading, comprising steps of:

(a) implementing a repeatable run-out compensation system that compensates for repeatable run-out during write operations but not during read operations; and (b) after implementing the repeatable run-out compensation system, performing reader-to-writer offset calibration.

2. The method of claim 1 further comprising a step (c), prior to step (a), of performing reader-to-writer offset calibration, and wherein performing step (b) comprises performing additional reader-to-writer offset calibration after implementing the repeatable run-out compensation system to account for changes in reader-to-writer offset resulting from implementation of the repeatable run-out compensation system.

3. The method of claim 1 wherein performing step (b) comprises:

(b)(i) experimentally determining read error rates for a given data track across a range of reader-to-writer offset values; and (b)(ii) determining an optimum reader-to-writer offset based on the experimentally determined read error rates.

4. The method of claim 3 wherein determining step (b)(ii) comprises:

(b)(ii)(A) generating a curve representing read error rates as a function of reader-to-writer offset; and (b)(ii)(B) determining the optimum reader-to-writer offset based on the shape of the curve.

5. The method of claim 1 wherein performing step (b) comprises performing reader-to-writer offset calibration at each track of a disc surface.

6. The method of claim 1 wherein performing step (b) comprises performing reader-to-writer offset calibration at fewer than all of the tracks of a disc surface and interpolating the reader-to-writer offset at tracks lying between the calibrated tracks.

7. A disc drive comprising:

a disc adapted to store data and including a servo track adapted to store servo information used to indicate the position of a head relative to the servo track;

a head having a writer adapted to write data to the disc and a reader adapted to read data from the disc;

an actuator adapted to position the head relative to a surface of the disc in response to a servo control signal;

a repeatable run-out compensation circuit adapted to compensate for repeatable run-out of the servo track during write operations but not during read operations; and a servo controller adapted to generate a servo control signal based in part on a reader-to-writer offset that is calibrated while the compensation circuit is operational.

8. The disc drive of claim 7 wherein the disc includes a plurality of servo tracks, wherein the reader-to-writer offset is calibrated for each of the plurality of servo tracks and wherein the servo controller is adapted to generate a servo control signal based in part on the reader-to-writer offset corresponding to the servo track that the head is being positioned over.

9. The disc drive of claim 7 wherein the disc includes a plurality of servo tracks, wherein an actual reader-to-writer offset is calibrated for fewer than all of the plurality of servo tracks, wherein interpolated reader-to-writer offsets are interpolated for tracks lying between the calibrated tracks and wherein the servo controller is adapted to generate a servo control signal based in part on the actual or interpolated reader-to-writer offset corresponding to the servo track that the head is being positioned over.

10. A disc drive comprising:

a repeatable run-out compensation circuit adapted to compensate for repeatable run-out of a servo track on a disc surface during write operations but not during read operations; and means for calibrating a reader-to-writer offset of a data head while the compensation circuit is operational.

* * * * *